(12) United States Patent
Beaudoin et al.

(10) Patent No.: US 10,006,543 B2
(45) Date of Patent: Jun. 26, 2018

(54) OVER CLAMPING PROTECTION METHOD AND CLAMPING MECHANISM THEREFOR

(75) Inventors: Samuel Beaudoin, Yamaska (CA); Paul Okulov, Ste-Anne-de-Bellevue (CA); Alexandre Blouin, Beloeil (CA); Christian McMahon, Montréal (CA); David Gauthier Roy, Saint-Michel (CA); Francois Messier, Varennes (CA); Jean-Robert Desmeules, Trois-Rivières (CA); Kenneth Huston, Montréal (CA); Mathieu Guertin, Mont-Saint-Hilaire (CA); Patrick Cyr Gagné, Montréal (CA); Patrick Raymond, Saint-Bruno (CA)

(73) Assignee: Transmission CVTCORP Inc., Quebec (CA)

( * ) Notice: Subject to any disclaimer, the term of this patent is extended or adjusted under 35 U.S.C. 154(b) by 888 days.

(21) Appl. No.: 14/239,584

(22) PCT Filed: Aug. 3, 2012

(86) PCT No.: PCT/CA2012/000735
§ 371 (c)(1),
(2), (4) Date: May 23, 2014

(87) PCT Pub. No.: WO2013/029147
PCT Pub. Date: Mar. 7, 2013

(65) Prior Publication Data
US 2014/0257655 A1    Sep. 11, 2014

Related U.S. Application Data

(60) Provisional application No. 61/527,912, filed on Aug. 26, 2011.

(51) Int. Cl.
*F16H 61/664* (2006.01)
*F16H 15/38* (2006.01)

(52) U.S. Cl.
CPC ......... *F16H 61/6649* (2013.01); *F16H 15/38* (2013.01)

(58) Field of Classification Search
None
See application file for complete search history.

(56) References Cited

U.S. PATENT DOCUMENTS

| | | | |
|---|---|---|---|
| 3,277,745 | A | 10/1966 | Harned |
| 3,822,610 | A | 7/1974 | Erban |
| 7,198,585 | B2 | 4/2007 | Miller et al. |

FOREIGN PATENT DOCUMENTS

| | | |
|---|---|---|
| CA | 2516494 A1 | 9/2004 |
| GB | 254341 | 12/1927 |
| GB | 2478003 A | 8/2011 |
| WO | 2011134076 A1 | 11/2011 |

OTHER PUBLICATIONS

International Search Report for PCT Application No. PCT/CA2012/000735; dated Nov. 5 2012; (5 pages).
Written Opinion for PCT Application No. PCT/CA2012/000735; dated Nov. 5 2012; (7 pages).

*Primary Examiner* — Erin D Bishop
(74) *Attorney, Agent, or Firm* — K&L Gates LLP

(57) ABSTRACT

A method where the spin factor is looked up in a table; the slip factor is measured and the clamping pressure is adjusted to achieve a slip/spin ratio provided in a desired range is described herein. According to another aspect, an active mechanical clamping mechanism using a longitudinally movable contact point is also described.

7 Claims, 10 Drawing Sheets

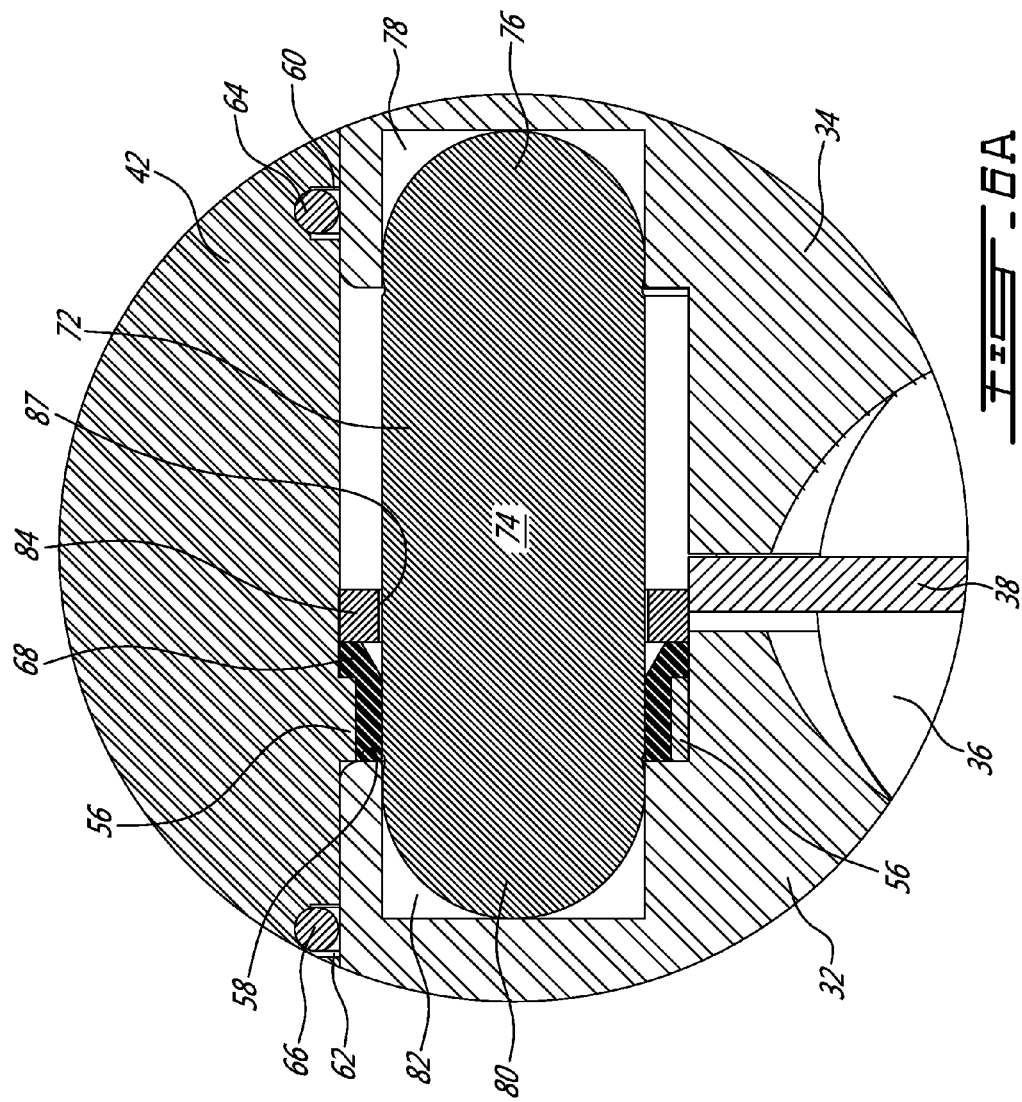

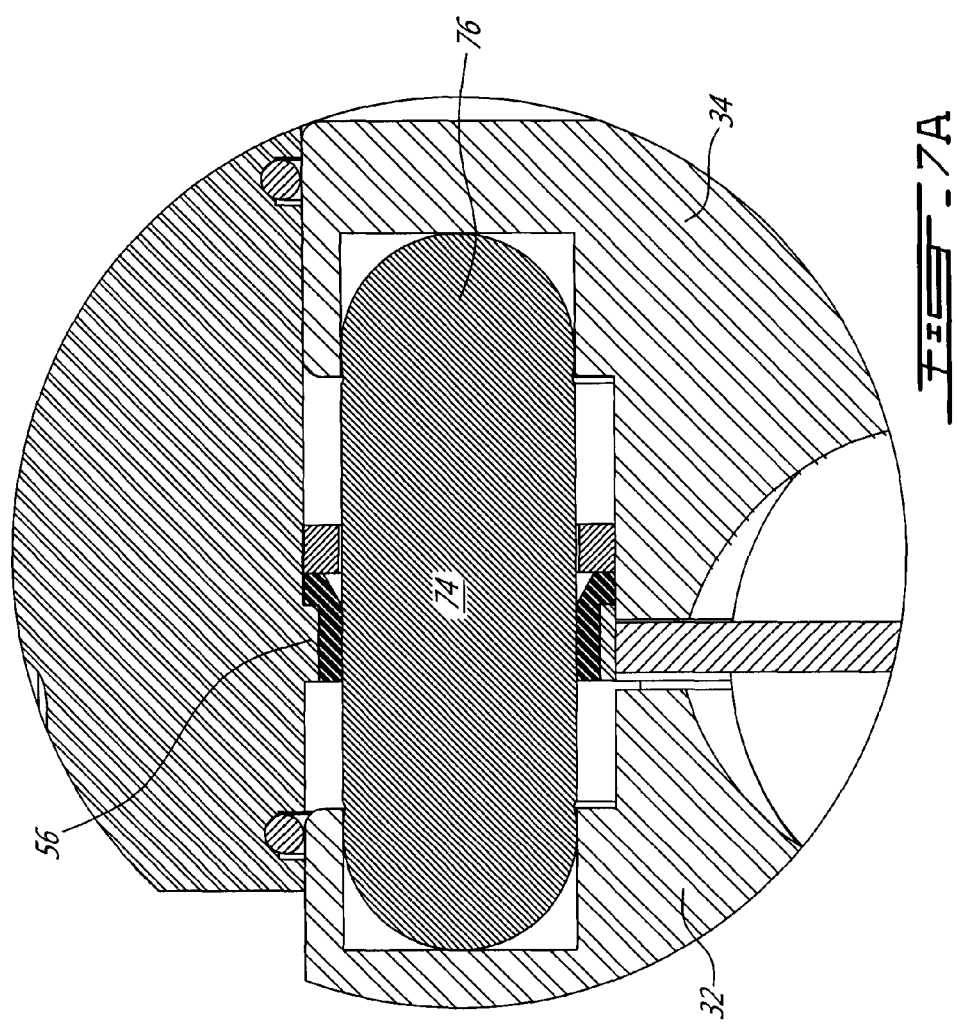

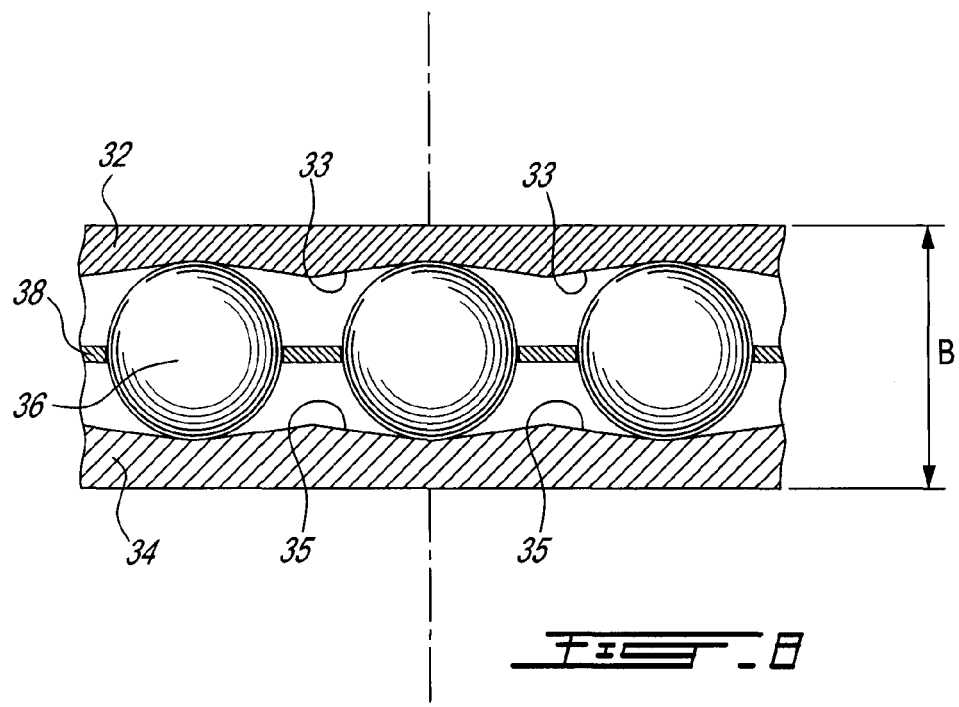
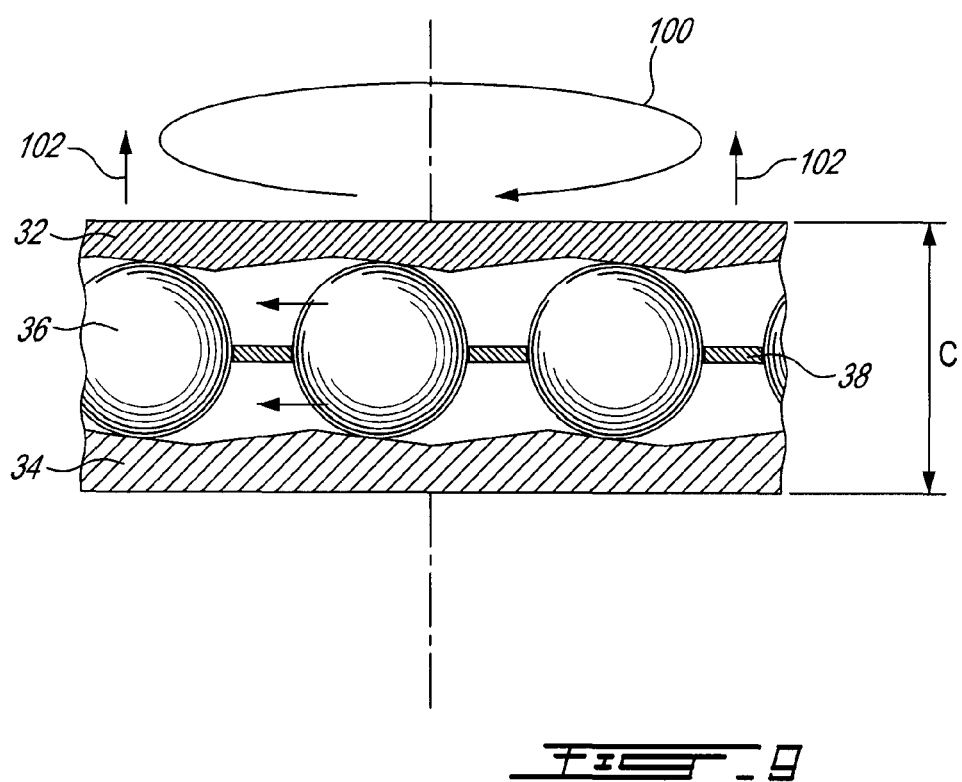

OVER CLAMPING PROTECTION METHOD AND CLAMPING MECHANISM THEREFOR

CROSS REFERENCE TO RELATED APPLICATIONS

This application is a national phase under 35 U.S.C. § 371 of International Application No. PCT/CA2012/000735 filed on Aug. 3, 2012, which claims priority to and benefit of U.S. Provisional Ser. No. 61/527,912 filed on Aug. 26, 2011, and the entirety of these applications are incorporated by reference herein.

FIELD

The present disclosure generally relates to Toric-drive Continuously Variable Transmissions. More specifically, the present disclosure is concerned with methods and clamping mechanisms to prevent over clamping of such transmissions and to mechanically control the clamping pressure applied to such transmission.

BACKGROUND

Toric-drive Continuously Variable Transmissions (hereinafter generically referred to as "CVT") are believed known in the art. The operation of such a CVT will therefore only be briefly discussed herein.

Generally stated, a CVT is provided with a drive disk having a toroidal surface, a driven disk also having a toroidal surface and facing the toroidal surface of the drive disk, both disks being linked by rollers in contact with their respective toroidal surfaces. The angle of the rollers with respect to the drive and driven disks dictates the speed ratio between the driven and drive disks since this angle dictates the radial position at which the rollers contact the toroidal surfaces.

Such a CVT requires some kind of preloading mechanism to force the drive and driven disks towards each other to provide a predetermined minimal friction between the disks and the rollers. A pressure applying mechanism, also known as a clamping mechanism, is generally also provided to increase the pressure compressing the disks towards each other, therefore increasing the pressure between the disks and the rollers, when the CVT is in use.

It has been found that in a CVT configuration, the clamping forces have an impact on the lifespan of the CVT components, particularly on the disks. In other words, over clamping may be detrimental to the lifespan of the CVT.

It also has been found that to prevent slippage, a sufficient clamping force has to be applied to ensure that an adequate friction exists between the rollers and the disks. The slip amount is generally determined as the difference in linear speed between the driving surface and the driven surface.

The spin is defined as a pivoting or rotating motion of two surfaces in contact relative to each other. When two curved or rounded bodies are compressed together, an ellipse is formed at the point of contact. Because the two bodies do not rotate about the same axis, and since the plane of contact can be in various positions relative to the axis of rotation of the two bodies, the ellipse of contact of the first body will be in a rotating or pivoting motion relative to the ellipse of contact of the second body. This relative motion of rotation of two ellipses in contact is referred to as spin.

It has been found that by providing a slip/spin ratio of about 0.8 the contact has the most efficient power transmission. In each contact, there is a loss of speed due to slip, and a loss of torque due to spin. At a ratio of slip to spin of about 0.8, the proportion of loss of each is minimised yielding the best efficiency. At greater rates of spin, torque loss increases at a greater rate than slip loss decreases, and subsequently decreases efficiency. At greater rates of slip, it is the opposite, the power loss due to slip is greater than the decrease in torque loss due to decreased spin.

BRIEF DESCRIPTION OF THE DRAWINGS

In the appended drawings:

FIG. 6A is an enlarged portion of a section of FIG. 6;

FIG. 7A is an enlarged portion of a section of FIG. 7;

FIG. 8 is a sectional view of a portion of the clamping mechanism when the clamping mechanism is at rest; and FIG. 9 is a sectional view similar to FIG. 8 showing the clamping mechanism in operation.

DETAILED DESCRIPTION

Figure 1:
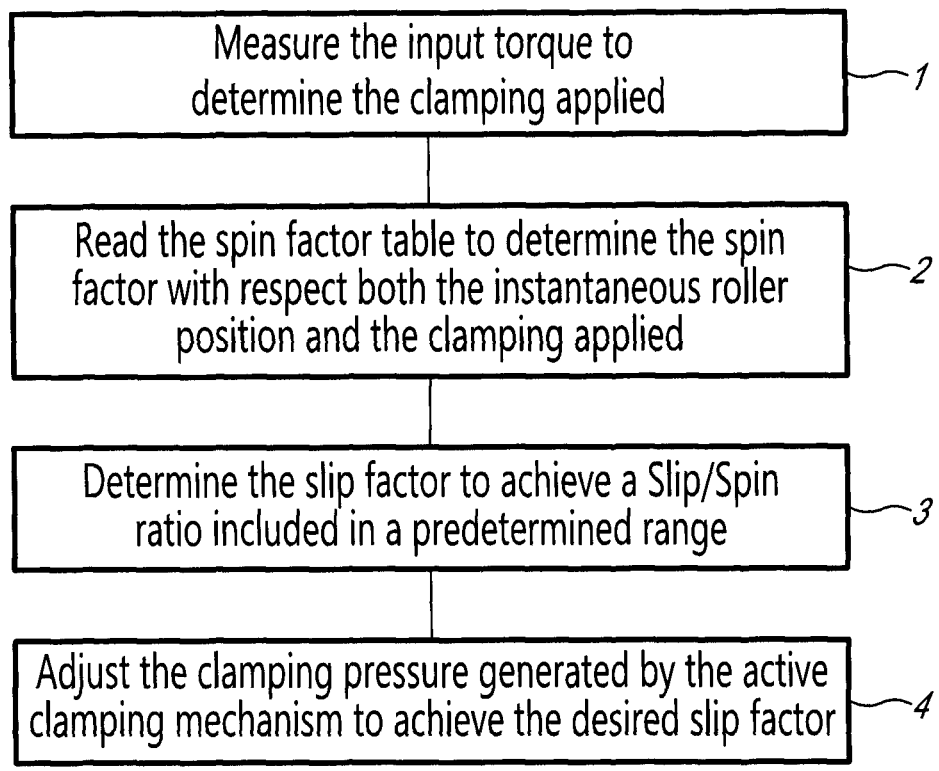
FIG. 1 is a block diagram of a method for preventing over clamping according to an illustrative embodiment.

An object is generally to provide an improved over clamping protection method and clamping mechanism to control the amount of torque applied to a mechanical.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

It is to be noted that the expression "prime mover" is to be construed herein and in the appended claims as an internal combustion engine a turbine engine, or any other mechanical power production element, assembly or mechanism.

It is to be noted that while the expression "CVT", standing for Continuously Variable Transmission, is generally used herein to refer to a dual-cavity full toroidal CVT, this expression is to be construed herein and in the appended claims as any type of toroidal CVT such as, for example, half-toroidal CVT and single cavity toroidal CVT.

It is to be noted that the expression "overdrive", when used herein in the context of a CVT, is to be construed herein and in the appended claims as a condition where the CVT ratio is such that the CVT output speed is higher than the CVT input speed.

It is to be noted that the expression "underdrive" when used herein in the context of a CVT, is to be construed herein and in the appended claims as a condition where the CVT ratio is such that the CVT output speed is lower than the CVT input speed.

Other objects, advantages and features of the over clamping protection method and clamping mechanism therefor will become more apparent upon reading of the following non-restrictive description of illustrative embodiments thereof, given by way of example only with reference to the accompanying drawings.

According to a first aspect, there is provided a method for preventing over clamping of a CVT, the method comprising:

constructing a spin table according to the geometry of the particular CVT configuration;

measuring the input torque of the CVT;

reading the spin factor table to determine the spin factor with respect to an instantaneous roller position and to a clamping applied;

determining the desired slip factor to achieve a slip/spin ratio provided in a desired range; and adjusting the clamping pressure to achieve the desired slip factor.

According to another aspect, there is provided an active clamping mechanism for a CVT provided with a longitudinal drive shaft, a drive disk and a driven disk, the pressure applying mechanism comprising:

a pressure applying element longitudinally movable onto the drive shaft; the pressure-applying element having a first surface configured to contact one of the drive and driven disks and an opposite surface including at least three V-shaped double ramps;

a secondary element so mounted to the longitudinal drive shaft as to be longitudinally fixed thereonto; the secondary element having a surface facing the pressure-applying element including at least three V-shaped double ramps;

at least three ball bearings interposed between the V-shaped ramps of the pressure applying and secondary elements;

a longitudinally variable position driving assembly so configured as to transmit torque to both the pressure applying and secondary elements in a proportion determined by the longitudinal position of an input gear thereof; one of the pressure-applying element and the secondary element being free to rotate about the drive shaft and the other of the pressure-applying element and the secondary element being so mounted to the drive shaft as to be prevented from rotating thereabout;

whereby, the portion of torque applied to the pressure-applying element results in a pressure applied to the one of the drive and driven disks via a small circumferential displacement of the at least three ball bearings in the facing V-shaped double ramps of the pressure applying and secondary elements.

Generally stated, illustrative embodiments describe a method where the spin factor is looked up in a table; the slip factor is measured and the clamping pressure is adjusted to achieve a slip/spin ratio provided in a desired range. According to another aspect, an active mechanical clamping mechanism using a longitudinally movable contact point is also described.

The spin factor is determined by the geometry of the rollers, of the flanges, of the angular position of the rollers in the cavities, by the clamping pressure, by the rotation speed of the rollers and disks and by the dimension of the ellipse formed at the point of contact between rollers and flanges. It is therefore possible to calculate a table of the spin factor for every angular position of the rollers in the cavities as a function of the clamping force applied.

The slip factor is therefore the variable that may be used to control the CVT so as to improve its overall efficiency. Accordingly, a table may be constructed, empirically or otherwise, to determine the amount of slip required for each angular position of the rollers to achieve the desired Slip/Spin ratio.

As will easily be understood by one skilled in the art, the slip factor may be measured by measuring the rotational speed of the disks and rollers.

The clamping forces that influence the slip may thus be controlled by an active clamping system that may quickly change the longitudinal clamping pressure applied onto the disks of the CVT. Accordingly, for a given angular position of the rollers in the cavities, since the spin is known, a clamping force is generated to bring the measured slip to a value such as to bring the Slip/Spin ratio to about 0.8.

FIG. 1 of the appended drawings schematically illustrates an over clamping method according to an illustrative embodiment. Once a spin table is constructed according to the geometry of the particular CVT configuration, step 1 consists in measuring the input torque of the CVT to calculate the clamping force applied. In step 2, the spin factor table is read to determine the spin factor with respect to the instantaneous roller position and clamping force applied. Then, in step 3, the desired slip factor is determined. Step 4 consists in adjusting the clamping pressure generated by the active clamping mechanism to achieve the desired slip factor. Step 4 is repeated periodically to ensure that the slip factor remains stable. Steps 1 to 4 are repeated each time the roller position is modified and each time the torque applied is modified.

Generally stated, the active clamping mechanisms according to illustrative embodiments generates a controllable longitudinal clamping force which mechanically applies pressure onto the disk of the CVT by transferring a controllable portion of the rotational torque received from a prime mover thereto.

Figure 2:
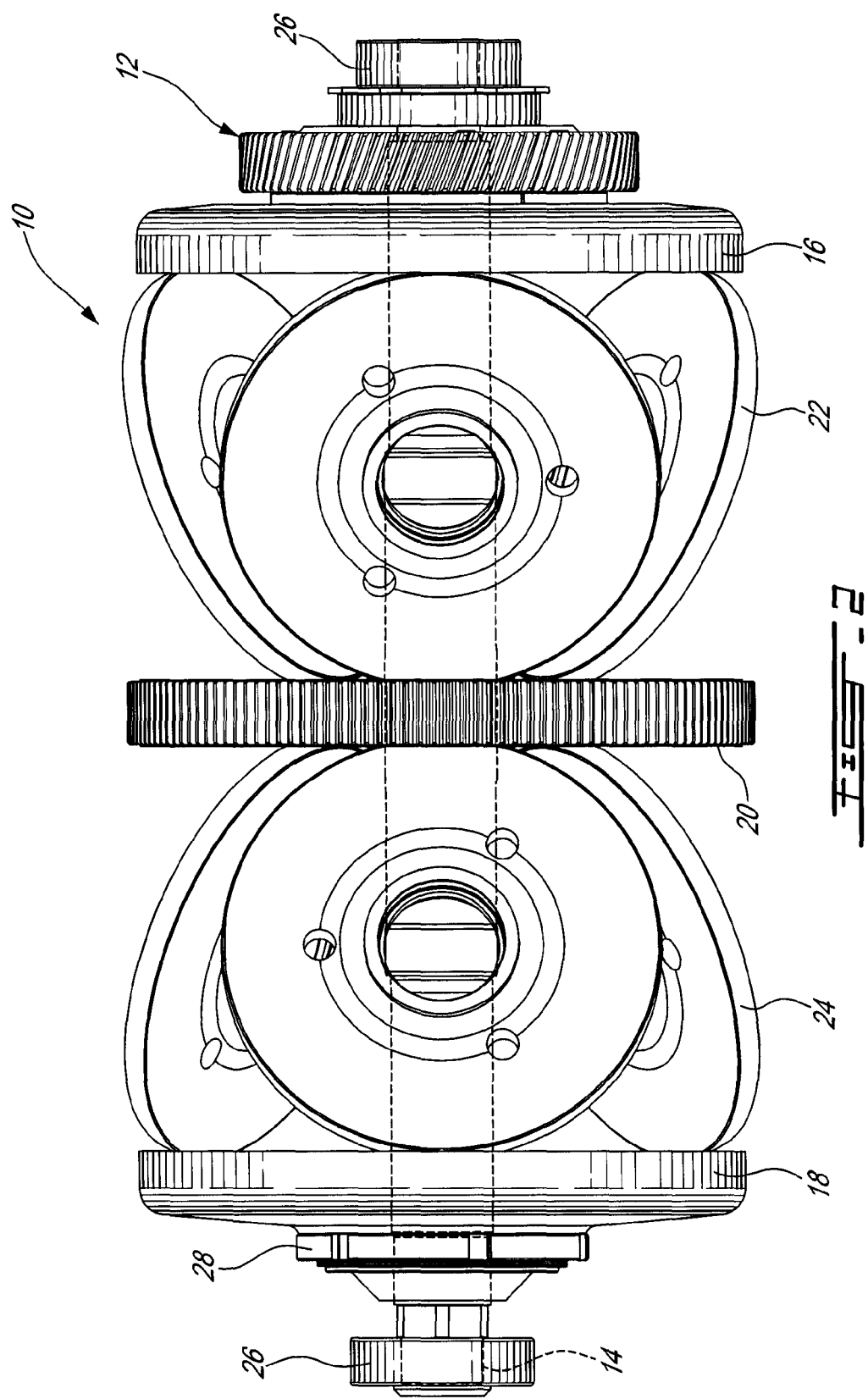
FIG. 2 is a front elevation view of a dual-cavity full toroidal CVT provided with an active clamping mechanism according to an illustrative embodiment.

Turning now to FIG. 2 of the appended drawings, a dual-cavity toric-drive CVT 10 including an active clamping mechanism 12 according to an illustrative embodiment will be described.

The toric-drive CVT 10 includes a longitudinal shaft 14 (shown in dashed lines) to which are mounted first and second drive disks 16 and 18 for rotation therewith. A driven disk 20 having a toothed outer surface is rotatably mounted to the shaft 14, for example via bearings (not shown). Three rollers 22 are provided between the first drive disk 16 and the driven disk 20 while three rollers 24 are provided between the second drive disk 18 and the driven disk 20. The longitudinal shaft 14 is mounted to a casing (not shown) via bearings 26. A preload tensioning nut 28 and the active clamping mechanism 12 are mounted near opposite longitudinal ends of the shaft 14.

It will easily be understood by one skilled in the art that the dual cavity toric-drive CVT 10 is only schematically illustrated in FIG. 2. Indeed, many subsystems such as, for example, a casing and a roller guiding subsystem, are not shown for clarity and since they have no incidence on the structure and operation of the active clamping mechanism described herein.

Turning now to the exploded views of FIGS. 3 and 4 of the appended drawings, the active clamping mechanism 12 and the preload mechanism 30 will be described.

The active clamping mechanism 12 includes a pressure applying element 32, a secondary element in the form of a shaft driving element 34, a plurality of ball bearings 36 mounted in a cage 38 and provided between the pressure applying element 32 and the shaft driving element 34. As can be seen from FIG. 3, the surface of the pressure applying element 32 facing the shaft driving element 34 includes, for each ball bearing 36, a ball bearing receiving V-shaped double ramp 33. Similarly, as can be seen from FIG. 4, the surface of the shaft-driving element 34 facing the pressure-applying element 32 includes, for each ball bearing 36, a ball bearing receiving V-shaped double ramp 35.

A longitudinally variable position driving assembly 40 interconnects a prime mover (not shown) to the CVT 10. More specifically, the driving assembly 40 includes a longitudinally movable gear 42 to which a toothed transmission element (not shown) may be connected and a sub-assembly 44 used to longitudinally move the gear 42.

The sub-assembly 44 includes an internally threaded sleeve 46 configured to me fixedly mounted to the casing (not shown) via fastener apertures 48; an externally threaded inner sleeve 50 meshed with the fixed sleeve 46; an outer sleeve 52 associated with the inner sleeve 50 and a bearing 54 rotatably mounting the inner and outer sleeves to the gear 42. The assembly of these elements is more clearly shown in FIG. 6.

Accordingly, rotation of the outer sleeve 52 causes the longitudinal movement of the inner sleeve 50 via its threaded relationship with the fixed sleeve 46 and therefore causes the longitudinal movement of the gear 42. The purpose of this longitudinal movement will be described hereinbelow. It is to be noted that one skilled in the art would be in a position to provided a mechanism to adequately rotate the outer sleeve 52.

Of course, the nature of the sub-assembly 44 could be modified by one skilled in the art to any other mechanism so configured as to controllably and relatively move the gear 42 longitudinally with respect to the other elements of the pressure applying mechanism 12. For example, a fork assembly and linear actuator or a hydraulic mechanism could be used.

Figure 3:
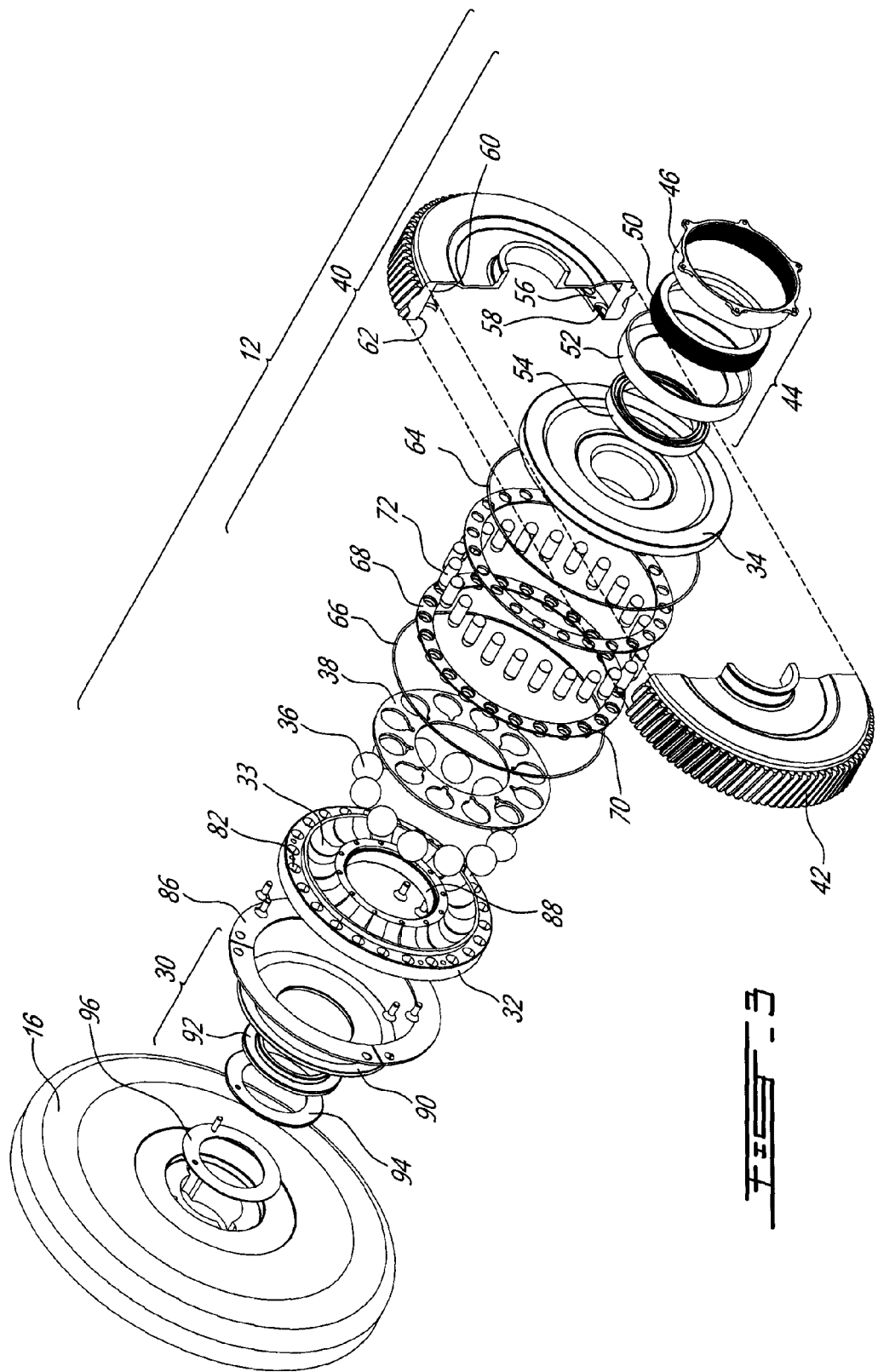
FIG. 3 is an exploded perspective view of a portion of the CVT of FIG. 2, viewed from the clamping mechanism side.
Figure 4:
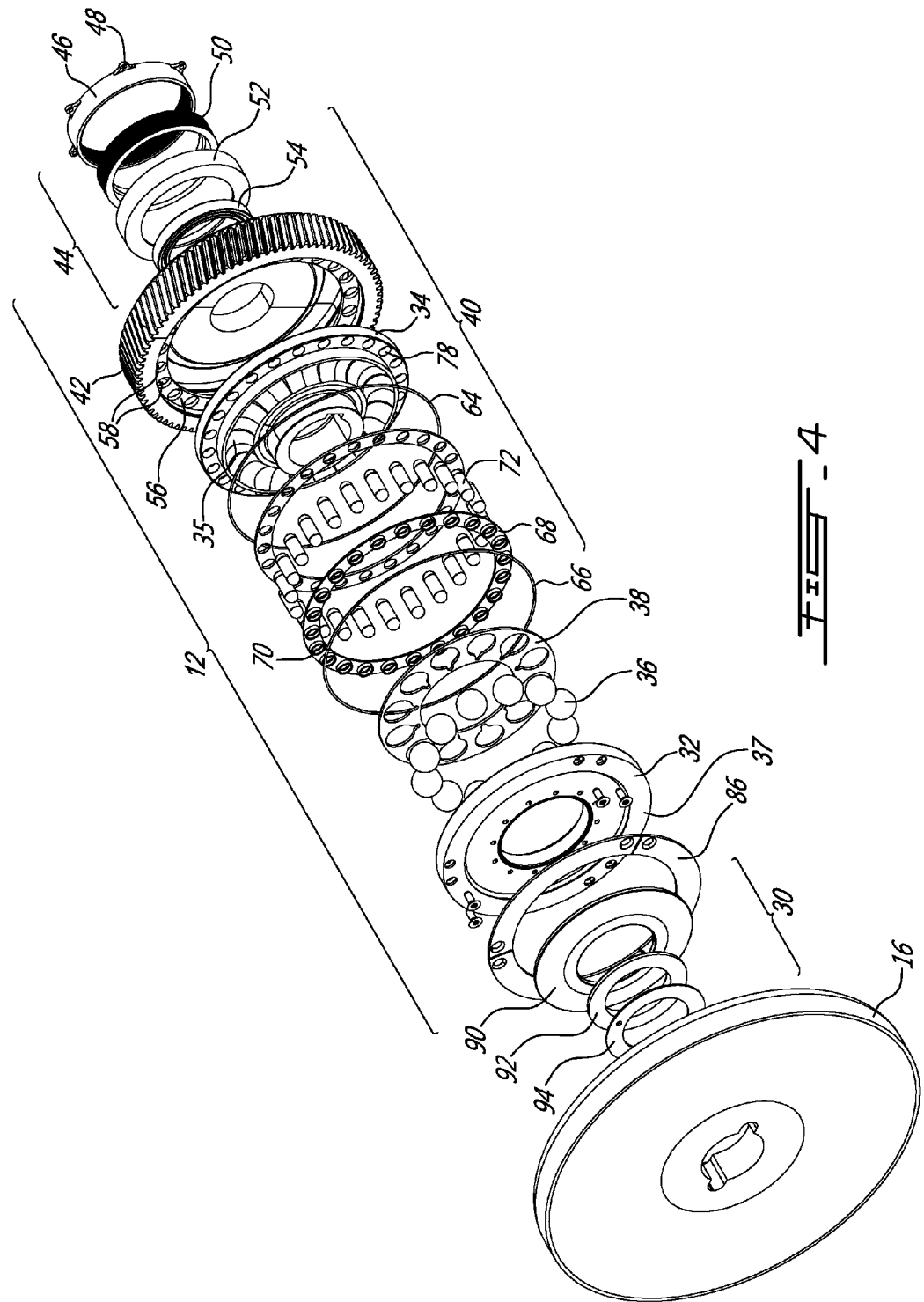
FIG. 4 is an exploded perspective view of a portion of the CVT of FIG. 2, viewed from the driving disk side.
Figure 5:
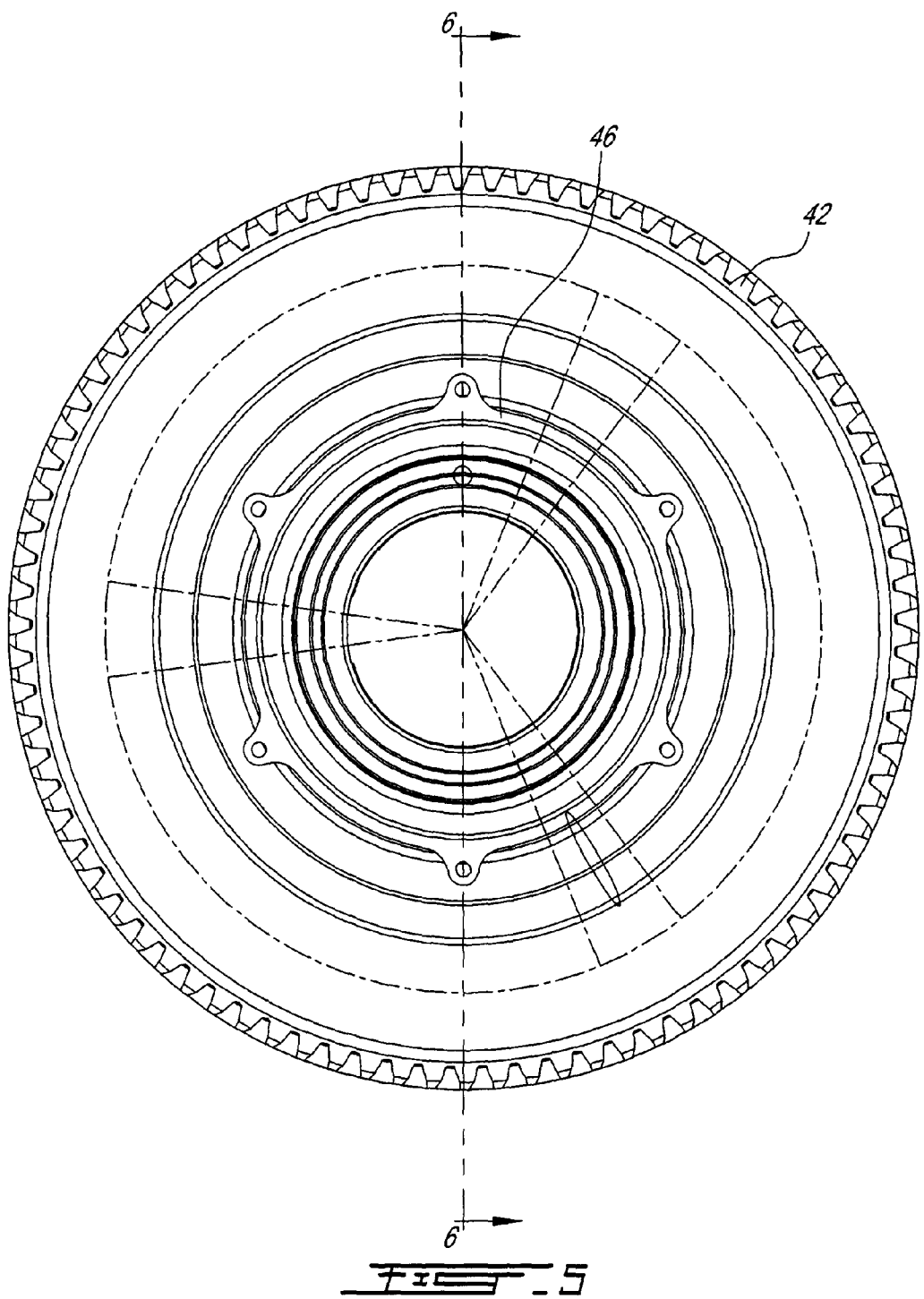
FIG. 5 is an end view of the CVT of FIG. 2.

As can be better seen from FIGS. 3 and 4, the gear 42 is a two-piece gear and integrally includes an internal ring 56 provided with a plurality of apertures 58. Two O-ring channels 60, 62 are configured to respectively receive O-rings 64 and 66 therein.

A plastic cage 68 provided with flanged apertures 70 configured to be fitted into the apertures 58 is provided inside the gear 42. The flanged apertures 70 are configured to receive torque-transmitting elements 72. As can be better seen from FIG. 6A, each torque transmitting elements 72 includes a central cylindrical portion 74, a first semi-hemispherical end 76 inserted in an aperture 78 of the shaft driving element 34 and a second semi-hemispherical end 80 inserted in an aperture 82 of the pressure applying element 32.

A metal cage 84, provided with apertures 87 allowing the torque transmitting elements 72 therethrough is also provided. The purpose of the metal cage 84 consists in longitudinally retaining the cage 68 against the gear 42.

Returning to FIG. 3, the active clamping mechanism 12 also includes a friction-reducing disk 86 mounted to the pressure-applying element 32 and a wear-preventing sleeve 88 provided between the pressure-applying element 32 and the shaft-driving element 34.

The preload mechanism 30 that also includes the preload nut 28 of FIG. 1 includes a Belleville washer 90, a Belleville washer-centering element 92 a friction reducing disk 94 and a washer 96. The surfaces of the Belleville washer-centering element 92 and of the washer 96 facing the friction-reducing disk 94 are polished so as to reduce the wear of the friction-reducing disk 94, which is typically made of brass.

One skilled in the art will understand that by tightening the preload nut 28, the Belleville washer 90 is compressed and therefore a preload clamping force is generated therefrom.

A first key (not shown) collaborates with a keyway (not shown) of the shaft 14 to prevent rotation of the first drive disk 16 with respect to the shaft 14 while a second key (not shown) collaborates with a keyway (not shown) of the shaft 14 to prevent rotation of the shaft-driving element 34 onto the shaft 14.

Figure 6:
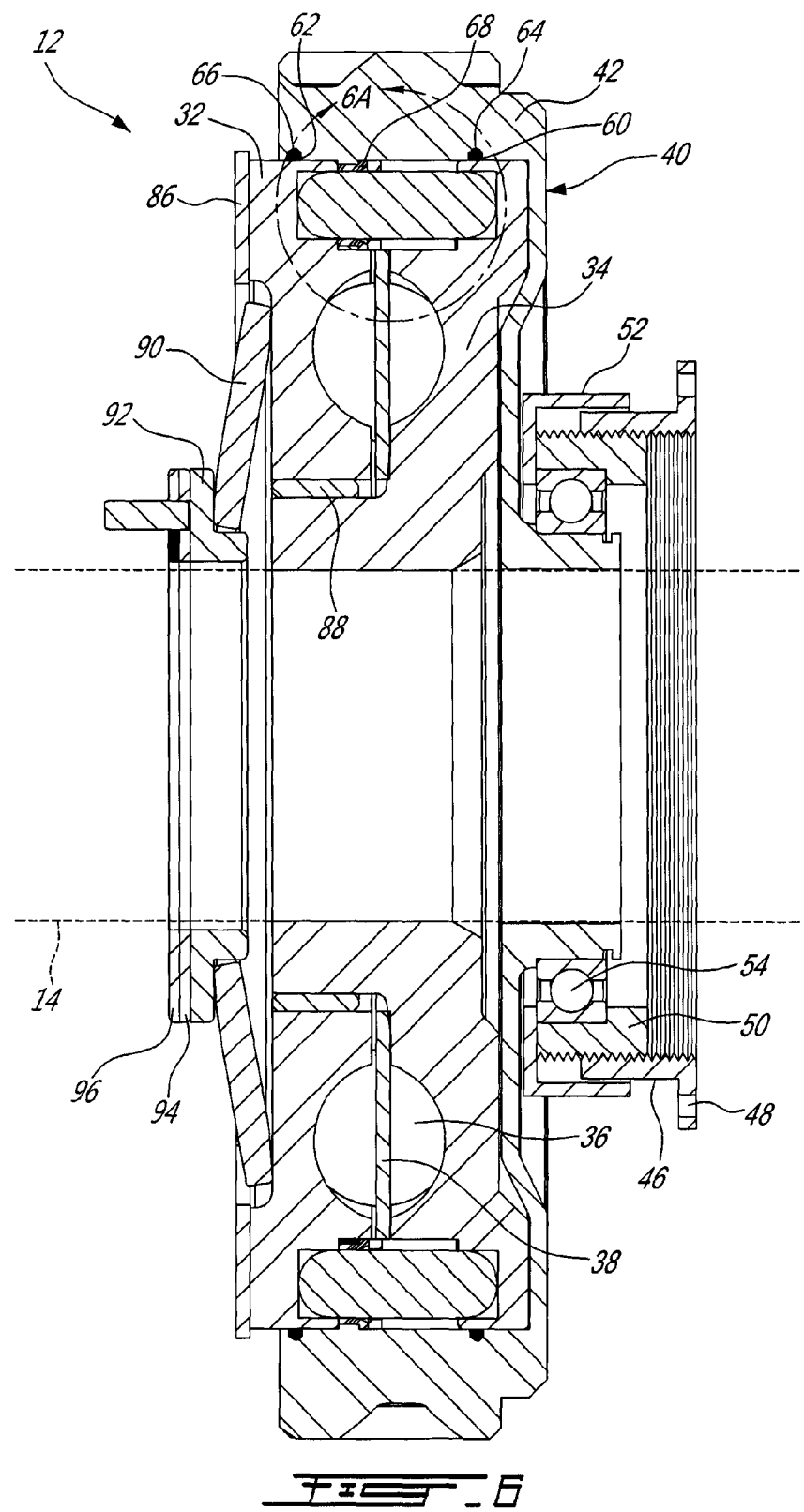
FIG. 6 is a sectional view taken along line 6-6 of FIG. 5, illustrating the active clamping mechanism in its maximal clamping position.

Turning now to FIGS. 6 and 6A, which show the active clamping mechanism 12 in its maximal clamping position, the operation of the active clamping mechanism will be described.

As mentioned hereinabove, the torque from the prime mover (not shown) is transferred to the CVT 10 via the gear 42 and a transmission belt (not shown). Since the gear 42 is not connected to the shaft 14, the torque must go through the active clamping mechanism 12 to be transferred to the CVT 10.

When the outer sleeve 52 has been rotated such that the gear 42 is in the position illustrated in FIGS. 6 and 6A, the internal ring 56 of the gear 42 is longitudinally positioned in line with the pressure applying element 32, as can be better seen in FIG. 6A. The torque therefore flows from the gear 42 to a portion of the central cylindrical portion 74 of each torque-transmitting element 72 that is close to the pressure-applying element 32. A major portion of the torque will therefore flow from the torque-transmitting element 72 to the pressure-applying element 32. Of course, a portion of the torque is transferred directly to the shaft-driving element 34 by the torque-transmitting element 72 via the interconnection of the semi-hemispherical end 76 with the shaft-driving element 34.

FIG. 8 illustrates a portion of the active clamping mechanism 12 when the CVT is not in use. More specifically, FIG. 8 shows the ball bearings 36 is a resting state, i.e. that they are positioned resting in the "bottom" of the V-shaped double ramps 33 and 35. Accordingly, the distance "B" is as small as possible.

FIG. 9 shows a portion of the active clamping mechanism 12 when a torque is applied to the toothed gear 42, i.e. when the CVT 10 is in use. When this is the case, the torque is transferred to the pressure-applying element 32 via its connection to the gear 42 by the torque-transmitting elements 72. This torque is represented by arrow 100 in FIG. 9. The torque detected by and applied to the pressure applying element 32 forces the element 32 to rotate. This rotation angularly moves the pressure-applying element 32 with respect to the shaft-driving element 34 since the shaft-driving element 34 is fixedly mounted to the shaft 14 (not shown). Accordingly, the ball bearings 36 do not stay in the bottom of the V-shaped double ramps 33 and 35 but are moved along one side of the ramps 33 and 35 until the outer surface of the friction-reducing element 86 is in contact with the disk 16. Accordingly, the pressure-applying element 32 applies clamping pressure to the disk 16.

Returning to FIGS. 6 and 6A this position of the gear 42 is the position where maximal clamping occurs since a major portion of the torque transits via the pressure-applying element 32, therefore causing an important longitudinal clamping pressure.

Figure 7:
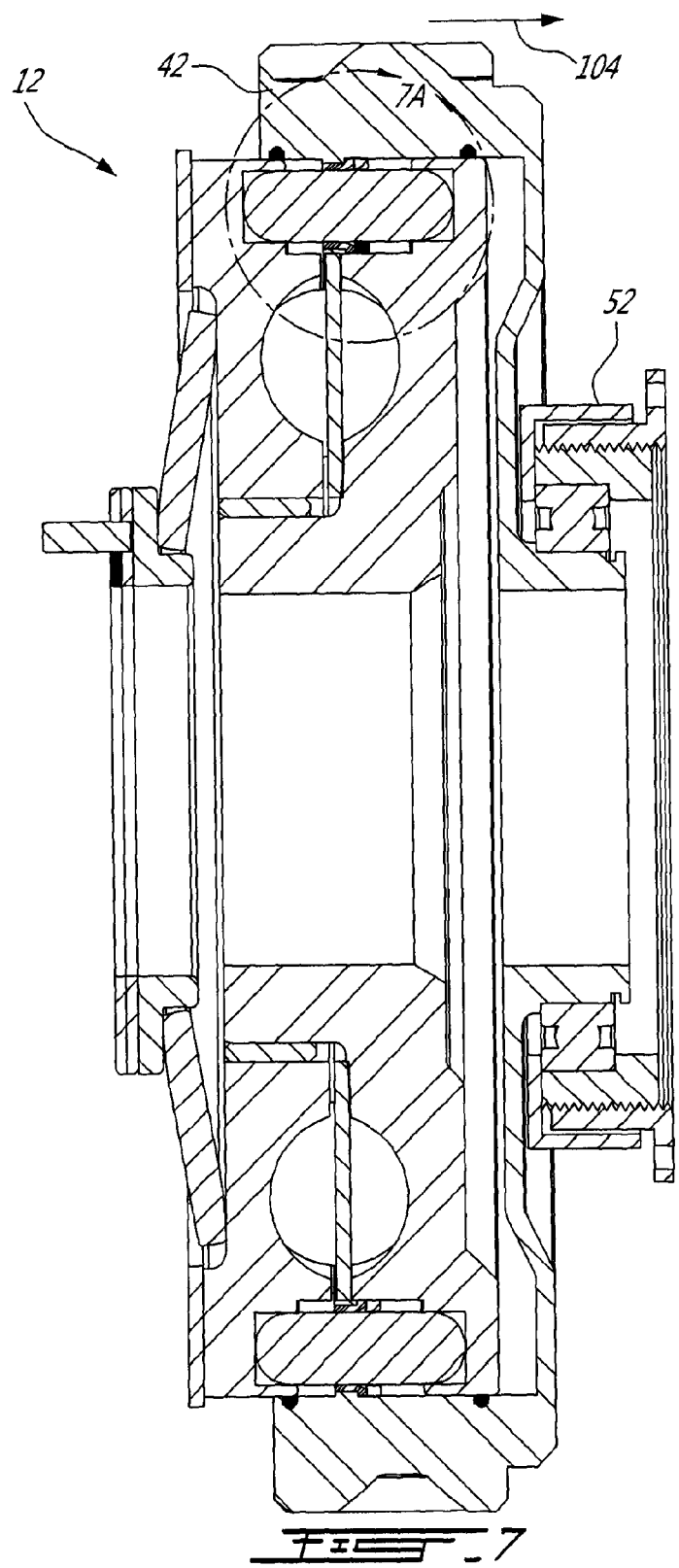
FIG. 7 is a sectional view taken along line 6-6 of FIG. 5, illustrating the active clamping mechanism in its minimal clamping position.

Turning now to FIGS. 7 and 7A, the minimal clamping pressure position will be described.

As can be seen from these figures, the outer sleeve 52 has been rotated to move the gear 42 in the direction of arrow 104. Accordingly, as can be better seen from FIG. 7A, the internal ring 56 of the gear 42 is not longitudinally positioned in line with the pressure applying element 32 but is at least partially in line with the shaft driving element 34. The torque therefore flows from the gear 42 to a portion of the central cylindrical portion 74 of each torque-transmitting element 72 that is close to the shaft-driving element 34. A major portion of the torque will therefore flow from the torque-transmitting element 72 to the shaft-driving element 34. Of course, a portion of the torque is transferred directly to the pressure-applying element 32 by the torque-transmitting element 72, but this portion of the torque is less than when the gear 42 is positioned as illustrated in FIGS. 6, 6A. Accordingly, since less torque transits by the pressure-applying element 32, less clamping pressure is generated by the element 32.

One skilled in the art will understand that the range of movement of the gear 42, and therefore of the internal ring 56, can be designed according to the particular range of clamping pressure required by the CVT.

While the maximal and minimal clamping pressure positions of the gear 42 have been discussed hereinabove and illustrated in the appended drawings, a multitude of intermediate positions of the gear 42 are possible to yield various longitudinal clamping pressures. These positions are achieved by rotating the outer sleeve 52 of the sub-assembly 44 to therefore longitudinally move the gear 42.

As will easily be understood by one skilled in the art, while the active clamping mechanism has been described herein as used to control the slip factor to achieve a desired slip/spin ratio, active clamping mechanisms can be used to generally mechanically control the clamping pressure applied to the CVT.

It is to be understood that the over clamping protection method and clamping mechanism therefor are not limited in its application to the details of construction and parts illustrated in the accompanying drawings and described hereinabove. The over clamping protection method and clamping mechanism therefor are capable of other embodiments and of being practiced in various ways. It is also to be understood that the phraseology or terminology used herein is for the purpose of description and not limitation. Hence, although the over clamping protection method and clamping mechanism therefor has been described hereinabove by way of illustrative embodiments thereof, it can be modified, without departing from the spirit, scope and nature of the subject invention.

What is claimed is:

1. An active clamping mechanism for a CVT, the CVT being provided with a longitudinal drive shaft, a drive disk and a driven disk, the active clamping mechanism comprising:

a pressure-applying element longitudinally movable onto the drive shaft; the pressure-applying element having a first surface configured to contact a friction-reducing disk provided between the pressure-applying element and the drive disk; the pressure-applying element also having an opposite surface including at least three V-shaped double ramps;

a secondary element so mounted to the longitudinal drive shaft as to be longitudinally fixed thereonto;

the secondary element having a surface facing the pressure-applying element including at least three V-shaped double ramps;

at least three ball bearings interposed between the V-shaped ramps of the pressure-applying and secondary elements;

a longitudinally variable position driving assembly so configured as to transmit torque to both the pressure-applying and secondary elements in a proportion determined by the longitudinal position of an input gear of the longitudinally variable position driving assembly; the pressure-applying element being free to rotate about the drive shaft and the secondary element being so mounted to the drive shaft as to be prevented from rotating thereabout;

whereby, the portion of torque applied to the pressure-applying element results in a pressure applied to the one of the drive and driven disks via a small circumferential displacement of the at least three ball bearings in the facing V-shaped double ramps of the pressure-applying and secondary elements.

2. The active clamping mechanism recited in claim 1, further comprising a preloading mechanism.

3. The active clamping mechanism as recited in claim 2, wherein the preloading mechanism is adjustable.

4. The active clamping mechanism as recited in claim 1, wherein the at least three ball bearings include twelve ball bearings.

5. The active clamping mechanism as recited in claim 1, wherein the ball bearings are mounted in a cage.

6. The active clamping mechanism as recited in claim 1, wherein the CVT is a dual cavity full toric-drive transmission.

7. The active clamping mechanism as recited in claim 1, wherein the longitudinally movable input gear includes an integral internal ring provided with a plurality of apertures;

a plastic cage provided with flanged apertures configured to be fitted into the apertures;

torque-transmitting elements mounted in the flanged apertures;

each torque transmitting element including a central cylindrical portion, a first semi-hemispherical end inserted in an aperture of the secondary element and a second semi-hemispherical end inserted in an aperture of the pressure-applying element;

longitudinal movements of the gear move the integral internal ring which, in turn, moves the point of contact between the ring and the torque transmitting element to change the proportion of the torque transferred to both the pressure-applying and secondary elements.

* * * * *